US012803955B2

(12) United States Patent
Wu et al.

(10) Patent No.: US 12,803,955 B2
(45) Date of Patent: Nov. 17, 2026

(54) CROSS-SECURITY-REGION RESOURCE ACCESS METHOD IN CLOUD COMPUTING SYSTEM AND ELECTRONIC DEVICE

(71) Applicant: CLOUD INTELLIGENCE ASSETS HOLDING (SINGAPORE) PRIVATE LIMITED, Singapore (SG)

(72) Inventors: Zhongjie Wu, Beijing (CN); Qiang Li, Beijing (CN); Shuo Huang, Beijing (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 37 days.

(21) Appl. No.: 18/855,595

(22) PCT Filed: May 29, 2023

(86) PCT No.: PCT/CN2023/096962
§ 371 (c)(1),
(2) Date: Oct. 9, 2024

(87) PCT Pub. No.: WO2023/231992
PCT Pub. Date: Dec. 7, 2023

(65) Prior Publication Data

US 2025/0247361 A1 Jul. 31, 2025

(30) Foreign Application Priority Data

May 31, 2022 (CN) ......................... 202210607667.2

(51) Int. Cl.
*H04L 29/06* (2006.01)
*H04L 9/40* (2022.01)
(Continued)

(52) U.S. Cl.
CPC .......... *H04L 63/0218* (2013.01); *H04L 63/10* (2013.01); *H04L 67/1097* (2013.01); *H04L 67/133* (2022.05)

(58) Field of Classification Search
CPC ... H04L 63/0218; H04L 67/133; H04L 63/10; H04L 67/1097
(Continued)

(56) References Cited

U.S. PATENT DOCUMENTS 9,407,601 B1 8/2016 Pittman
10,141,967 B1 * 11/2018 Mitra .................... H04L 67/133
(Continued)

FOREIGN PATENT DOCUMENTS

CN 104486110 A 4/2015
CN 104636077 A 5/2015
(Continued)

OTHER PUBLICATIONS

Grecuccio, "Combining blockchain and IoT: Food-chain traceability and beyond", 2020, Energies, pp. 1-19 (Year: 2020).*
(Continued)

*Primary Examiner* — Taghi T Arani
*Assistant Examiner* — Gregory A Lane

(57) ABSTRACT

In a cross-security-region resource access method in a cloud computing system, a virtual block device, which is simulated by a virtio protocol-based BLK front-end driver in the cloud computing system and taken as an RPC calling client, receives an IO access request for data resources maintained by a resource service program triggered by a business application installed on each virtual node through a simulated RPC channel on the virtual block device; in response to the IO access request, encapsulates the IO access request into an RPC request for performing an RPC calling for target data resources, sends the RPC request to a RPC calling
(Continued)

server program simulated by a virtio protocol-based BLK service through the RPC channel, so that the RPC calling server program submits the RPC request to a resource access agent program, which submits the RPC request to the resource service program to complete cross-security region resource access.

20 Claims, 5 Drawing Sheets

(51) Int. Cl.
*H04L 67/1097* (2022.01)
*H04L 67/133* (2022.01)

(58) Field of Classification Search
USPC .................................................... 726/11
See application file for complete search history.

(56) References Cited

U.S. PATENT DOCUMENTS

| | | | | |
|---|---|---|---|---|
| 12,189,800 | B1 * | 1/2025 | La Schiazza ....... G06F 21/6218 | |
| 2004/0078520 | A1 * | 4/2004 | Don ..................... G06F 3/0689 | 711/158 |
| 2009/0182930 | A1 * | 7/2009 | Taguchi ................. G06F 3/061 | 711/E12.001 |
| 2009/0248699 | A1 | 10/2009 | Alvarez et al. | |
| 2012/0017209 | A1 | 1/2012 | Ben-Yehuda et al. | |
| 2012/0150916 | A1 * | 6/2012 | Anilson .............. G06F 11/1402 | 707/E17.005 |
| 2013/0067139 | A1 * | 3/2013 | Yamamoto ............. G06F 3/065 | 711/E12.008 |
| 2013/0198738 | A1 | 8/2013 | Reddin et al. | |
| 2015/0195294 | A1 * | 7/2015 | Yamada .............. H04L 63/1416 | 726/22 |
| 2020/0293465 | A1 * | 9/2020 | Yang ....................... H04L 49/35 | |
| 2021/0117242 | A1 * | 4/2021 | Van De Groenendaal .................. | H04L 67/51 |
| 2021/0165701 | A1 * | 6/2021 | Fujino ..................... G06F 21/44 | |
| 2022/0086226 | A1 * | 3/2022 | Jain ....................... G06F 13/105 | |

FOREIGN PATENT DOCUMENTS

| | | | |
|---|---|---|---|
| CN | 109885377 | A | 6/2019 |
| CN | 112041838 | A | 12/2020 |
| CN | 112491592 | A | 3/2021 |
| CN | 113467970 | A | 10/2021 |
| CN | 113703672 | A | 11/2021 |
| CN | 114020406 | A | 2/2022 |
| CN | 114499945 | A | 5/2022 |
| CN | 114710366 | A | 7/2022 |

OTHER PUBLICATIONS

Lazarrev, "Dagger: efficient and fast RPCs in cloud microservices with near-memory reconfigurable NICs", 2021, ACM, pp. 36-49 (Year: 2021).*
International Search Report and Written Opinion dated Aug. 24, 2023 for International Application No. PCT/CN2023/096962.
The First Examination Opinion Notice dated Jul. 20, 2022 for Chinese Application No. 202210607667.2.
Notification of Grant of Patent Rights for Inventions dated Aug. 3, 2022 for Chinese Application No. 202210607667.2.
Zirui Zhuang et al. "Tenant-Oriented Customized VM Networking Technology" Oct. 20, 2015, State Key Laboratory of Networking and Switching Technology, Beijing University of Posts and Telecommuncations, Beijing 100876, China.
Yunlong Cai "Design of private cloud system based on Docker" Electronic Engineering & Product World, Apr. 2016, pp. 46-56.
The Extended European Search Report for European Patent Application No. 23815171.6, dated Jul. 30, 2025.
Michael S. Tsirkin et al., "Virtual I/O Device (VIRTIO) Version 1.2," OASIS, May 9, 2022.
Jonah Palmer, "Introduction to VirtIO," Linux Kernel Development, Technologies, May 24, 2022.

* cited by examiner

CROSS-SECURITY-REGION RESOURCE ACCESS METHOD IN CLOUD COMPUTING SYSTEM AND ELECTRONIC DEVICE

CROSS-REFERENCE TO RELATED APPLICATIONS

This application is a National Stage of International Application No. PCT/CN2023/096962, filed on May 29, 2023, which claims priority to Chinese Patent Application No. 202210607667.2, filed to China National Intellectual Property Administration on May 31, 2022 and entitled "CROSS-SECURITY-REGION RESOURCE ACCESS METHOD IN CLOUD COMPUTING SYSTEM AND ELECTRONIC DEVICE". The contents of the two applications are hereby incorporated by reference in their entireties.

TECHNICAL FIELD

One or more embodiments of the present disclosure relate to the technical field of cloud computing, and in particular, to a cross-security-region resource access method and apparatus in a cloud computing system, an electronic device and a cloud computing system.

BACKGROUND

In a cloud computing system, computing resources (such as virtual machines) allocated to users (such as tenants in the cloud computing system) are usually configured in a security region, and public resources (such as storage resources) to be accessed by the computing resources are usually configured in another security region that is isolated from the security region where the computing resources reside.

Security regions are isolated from each other and cannot directly communicate with each other for resource access. Therefore, when computing resources need to access public resources across security regions, a network virtualization technology is used to implement cross-security-region resource access in existing technical solutions. However, the solution has the following problems: all IOs of the cross-security-region resource access are forwarded based on a centralized input/output (IO) forwarding mechanism. Although the IO forwarding mechanism can meet business requirements for bandwidth-oriented applications, it cannot meet business requirements of low latency for the IO latency-sensitive applications in a scenario of massive IOs and concurrent IOs.

SUMMARY

The present disclosure provides a cross-security-region resource access method in a cloud computing system, the cloud computing system includes at least one computing node device in a user security region; the computing node device includes at least one virtual node and a RPC calling server program simulated by a virtio protocol-based BLK service; the virtual node includes a virtual block device simulated by a front-end driver of the virtio protocol-based BLK service and taken as an RPC calling client; the virtual block device includes a simulated RPC channel with the RPC calling server program; the method includes:

receiving, by the virtual block device, an IO access request triggered by a business application installed on the virtual node; where the IO access request is used to perform IO access for target data resources in a resource security region; the user security region and the resource security region are isolated from each other; and encapsulating, by the virtual block device, the IO access request into an RPC request for performing an RPC calling for the target data resources in response to the IO access request, and sending the RPC request to the RPC calling server program through the RPC channel, so that the RPC calling server program initiates a cross-security-region RPC calling for the target data resources based on the RPC request.

In an implementation, the IO access request includes an IO write request for the virtual block device; the RPC request includes an "RPC request" request; where the IO write request includes a calling parameter related to the RPC calling performed for the target data resources; where the encapsulating, by the virtual block device, the IO access request into the RPC request for performing the RPC calling for the target data resources in response to the IO access request includes: writing, by the virtual block device, the calling parameter in the IO write request into a logical storage space of the virtual block device in response to the IO access request; and in response to successful writing of the calling parameter into the logical storage space of the virtual block device, returning a successful writing response message corresponding to the IO write request to the business application installed on the virtual node; encapsulating the calling parameter stored in the logical storage space to generate the "RPC request" for performing the RPC calling for the target data resources.

In an implementation, the IO access request further includes an IO read request for the virtual block device; the RPC request includes an RPC read request for reading an RPC response; where the encapsulating, by the virtual block device, the IO access request into the RPC request for performing the RPC calling for the target data resources in response to the IO access request includes: in response to the IO read request, encapsulating the IO read request into the RPC read request for reading the RPC response.

In an implementation, the logical storage space of the virtual block device includes a first logical storage subspace for carrying a command queue; the first logical storage subspace includes a pre-created command queue; a control command to be executed is maintained in the command queue; the control command includes an encapsulation command; the encapsulating the calling parameter stored in the logical storage space to generate the "RPC request" for performing the RPC calling for the target data resources includes: executing the encapsulation command in the command queue to encapsulate the calling parameter stored in the logical storage space to generate the "RPC request" for performing the RPC calling for the target data resources; the encapsulating the IO read request into the RPC read request for reading the RPC response includes: executing the encapsulation command in the command queue to encapsulate the IO read request into the RPC read request for reading the RPC response.

In an implementation, the logical storage space of the virtual block device further includes a second logical storage subspace for carrying a data queue; the control command further includes a creation command for dynamically creating the data queue; the RPC channel includes the data queue dynamically created in the second logical storage subspace by executing the control command; before the sending the RPC request to the RPC calling server program through the RPC channel, the method further includes: executing the creation command in the command queue to dynamically create a data channel for the business application in the second logical storage subspace.

In an implementation, the data queue includes a number of logical storage units; the sending the "RPC request" request to the RPC calling server program through the RPC channel includes: allocating an idle target logical storage unit to the "RPC request" request from the data queue, and writing the "RPC request" request into the target logical storage unit, so that the RPC calling server program reads the "RPC request" request from the target logical storage unit in the data queue; sending the RPC read request to the RPC calling server program through the RPC channel; and writing the RPC read request into the target logical storage unit for associated storage with the "RPC request" request, so that the RPC calling server program reads an RPC read request in associated storage with the "RPC request" request from the target logical storage unit in the data queue.

In an implementation, the writing the "RPC request" request into the target logical storage unit includes: writing the "RPC request" request into an RPC context created in the target logical storage unit; the writing the RPC read request into the target logical storage unit for associated storage with the "RPC request" request includes: writing the RPC read request into the RPC context created in the target logical storage unit, and performing associated storage with the "RPC request" request in the RPC context.

In an implementation, the cloud computing system further includes a resource service program in the resource security region; the computing node device further includes a resource access agent program corresponding to the at least one virtual node; the initiating, by the RPC calling server program, the cross-security-region RPC calling for the target data resources based on the RPC request includes: in response to the "RPC request" request read from the target logical storage unit, submitting, by the RPC calling server program, the "RPC request" request to the resource access agent program to enable the resource access agent program to further submit the "RPC request" request to the resource service program in the resource security region, so that the resource service program executes the "RPC request" request and completes the cross-security-region RPC calling for the target data resources, and returns an RPC response generated by the RPC calling to the RPC calling server program through the resource access agent program; in response to the RPC read request read from the target logical storage unit in associated storage with the "RPC request" request, further returning, by the RPC calling server program, the RPC response returned by the resource service program to the virtual block device, so that the virtual block device returns the RPC response to the business application.

In an implementation, the method further includes: after returning the RPC response to the business application, deleting, by the virtual block device, the "RPC request" request and the RPC read request which are in associated storage with each other in the target logical storage unit, recycling and releasing the target logical storage unit as an idle logical storage unit.

In an implementation, the logical storage space of the virtual block device further includes a third logical storage subspace for storing configuration information of the virtual block device; where the third logical storage subspace is a read-only storage space; the method further includes: receiving, by the virtual block device, a configuration information read request triggered by the business application installed on the virtual node; reading, by the virtual block device, the configuration information of the virtual block device from the third logical storage subspace in response to the configuration information read request, and returning the read configuration information to the business application.

The present disclosure also provides a cross-security-region resource access apparatus in a cloud computing system, the cloud computing system includes at least one computing node device in a user security region; the computing node device includes at least one virtual node and a RPC calling server program simulated by a virtio protocol-based BLK service; the virtual node includes a virtual block device simulated by a front-end driver of the virtio protocol-based BLK service and taken as an RPC calling client; the virtual block device includes a simulated RPC channel with the RPC calling server program; the apparatus includes:

- a receiving module, configured for the virtual block device to receive an IO access request triggered by a business application installed on the virtual node; where the IO access request is used to perform IO access for target data resources in a resource security region; the user security region and the resource security region are isolated from each other; and
- an access module, configured for the virtual block device to encapsulate the IO access request into an RPC request for performing an RPC calling for the target data resources in response to the IO access request, and send the RPC request to the RPC calling server program through the RPC channel, so that the RPC calling server program initiates a cross-security-region RPC calling for the target data resources based on the RPC request.

The present disclosure further provides an electronic device, including a communication interface, a processor, a memory and a bus, and the communication interface, the processor and the memory are interconnected through the bus; the memory stores machine readable instructions, and the processor executes the method by calling the machine readable instructions.

The present disclosure further provides a computer program that implements the above method when the computer program is executed by a processor.

The present disclosure further provides a computer readable storage medium on which a computer program is stored to implement the above method when the computer program is executed by a processor.

The present disclosure further provides a machine readable storage medium which stores machine readable instructions and implements the above method when the machine readable instructions are called and executed by a processor.

The present disclosure further proposes a cloud computing system, including: a computing node device in a user security region; a resource service program in a resource security region isolated from the user security region; the cloud computing system includes at least one computing node device in the user security region; the computing node device includes at least one virtual node and a RPC calling server program simulated by a virtio protocol-based BLK service; the virtual node includes a virtual block device simulated by a front-end driver of the virtio protocol-based BLK service and taken as an RPC calling client; the virtual block device includes a simulated RPC channel with the RPC calling server program;

- where the virtual block device receives an IO access request triggered by a business application installed on the virtual node; where the IO access request is used to perform IO access for target data resources in the resource security region; the user security region and the resource security region are isolated from each other; and the virtual block device encapsulates the IO access request into an RPC request for performing an RPC calling for the target data resources in response to the IO access request, and sends the RPC request to the RPC calling server program through the RPC channel, so that the RPC calling server program initiates a cross-security-region RPC calling for the target data resources based on the RPC request.

In the above technical solution, the virtual block device is simulated by the virtio protocol-based BLK front-end in the cloud computing system and taken as the RPC calling client. the virtual block device receives the IO access request for data resources maintained by the resource service program triggered by the business application on each virtual node through the simulated RPC channel of the RPC calling server program with the virtual block device; the virtual block device, in response to the IO access request, encapsulates the IO access request into the RPC request for performing the RPC calling for the target data resources, and sends the RPC request to the RPC calling server program through the RPC channel, so that the RPC calling server program initiates the cross-security-region RPC calling for the target data resources based on the RPC request, each computing node device in the user security region uses a virtio protocol-based RPC mechanism simulated by a virtio protocol-based BLK device to implement distributed access to cross-security-region resources of the resource service program in the resource security region isolated from the user security region. An IO forwarding path for resource access by the business application installed on each virtual node carried on each computing node is shortened, which greatly reduces the IO latency for resource access; a distributed access mechanism is used to access resources, avoiding a performance bottleneck of a central forwarding mechanism of network virtualization technology, and improving the overall efficiency of IO processing. Moreover, in the cloud computing system, the virtio protocol-based BLK device is used to simulate the virtio protocol-based RPC access mechanism, and the virtio protocol-based RPC access mechanism can be deployed in existing cloud computing systems, which has stronger applicability and practicability.

DESCRIPTION OF EMBODIMENTS

Illustrative embodiments will be illustrated in detail here, examples of which are shown in the attached drawings. Where the description below relates to drawings, the same numbers in different drawings represent the same or similar elements unless otherwise indicated. Implementations described in the following exemplary embodiments do not represent all implementations consistent with one or more embodiments of the present disclosure. Rather, they are only examples of the apparatus and method that are consistent with some aspects of one or more embodiments of the present disclosure as detailed in the attached claims.

It should be noted that in other embodiments, steps of the method are not necessarily performed in the order indicated and described in the present disclosure. In some other embodiments, the method may include more or fewer steps than described in the present disclosure. In addition, a single step described in the present disclosure may be described by breaking down into multiple steps in other embodiments; multiple steps described in the present disclosure may further be described by combining into a single step in other embodiments.

Figure 1:
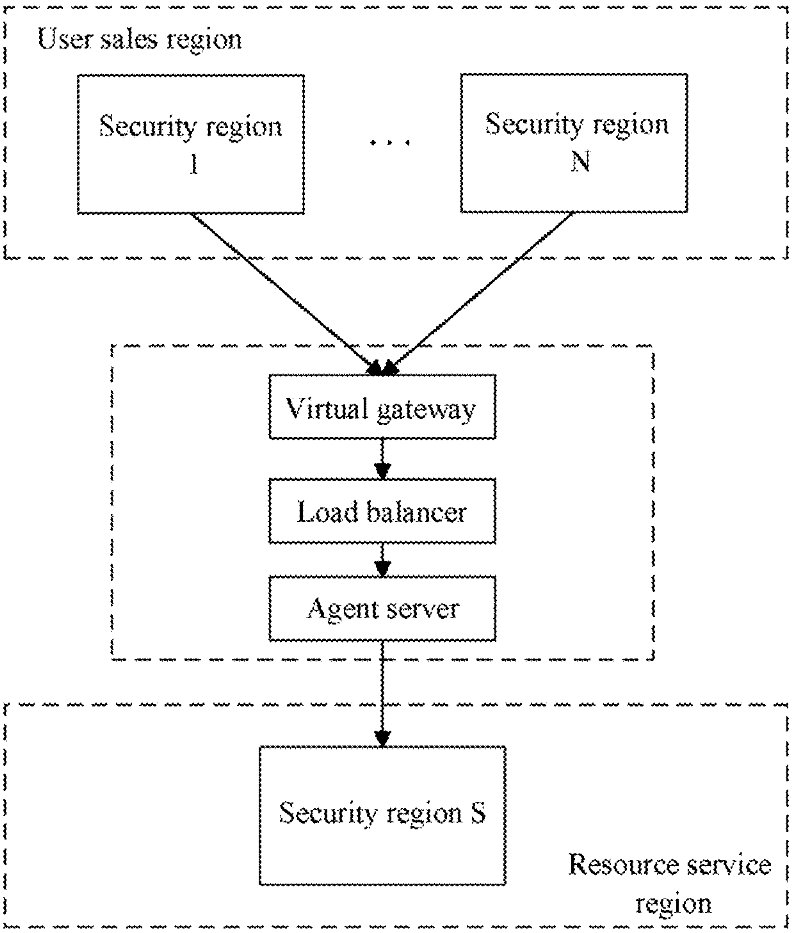
FIG. 1 is a schematic diagram of a network architecture of a cross-security-region resource access in a cloud computing system illustrated by an exemplary embodiment.

Please refer to FIG. 1, FIG. 1 is a schematic diagram of a network architecture of a cross-security-region resource access in a cloud computing system provided by an embodiment of the present disclosure.

As shown in FIG. 1, a region where a computing node device is located is referred to as a user sales region (for example, security region 1, . . . , security region N), a region where resources to be accessed by the computing node device are located is referred to as a resource service region (for example, security region S);

where each security region in the user sales region can contain multiple computing node devices, in order to ensure the security of business on the computing node device to access resources in the resource service region, the cloud computing system can securely isolate the computing node device of different users (tenants) (for example, security region 1, . . . , security region N is isolated from each other), and can securely isolate the computing node device and resources to be accessed (for example, security region 1, . . . , security region N is isolated from security region S).

After the user sales region and the resource service region are isolated, when the business on the computing node device in the user sales region access resources in the resource service region, in some technical solutions, a network virtualization technology is used to implement cross-region resource access.

For example, please refer to FIG. 1, a virtual network, a load balancer, and an agent server form a network virtualization technology solution. A virtual gateway can provide tunnel technologies such as vxlan, network packets from the user sales region to access the resource service region need to pass through the virtual gateway for IP address translation and packet forwarding. The load balancer and the agent server managed by the load balancer are used to provide a load balancing mechanism. To prevent performance bottlenecks in accessing the resource service region, the load balancing mechanism is needed to distribute a resource access IO of the user sales region to different agent servers so that the access to resources in the resource service region is balanced.

However, in the network virtualization solution, a centralized IO forwarding mechanism is formed by the virtual gateway, the load balancer and the agent server. In this mechanism, the following problems exist: all IO forwarding paths in the user sales region need to pass through the virtual gateway, the load balancer, and the agent server in sequence in order to access the resource service region. For bandwidth-oriented applications, scaling the number of virtual gateways, load balancers, and agent servers can still meet bandwidth requirements of the business. However, for IO latency-sensitive applications, this mechanism cannot meet business requirements with low latency due to a long IO forwarding path and increased IO scheduling latency due to a large number of concurrent IOs.

Figure 2:
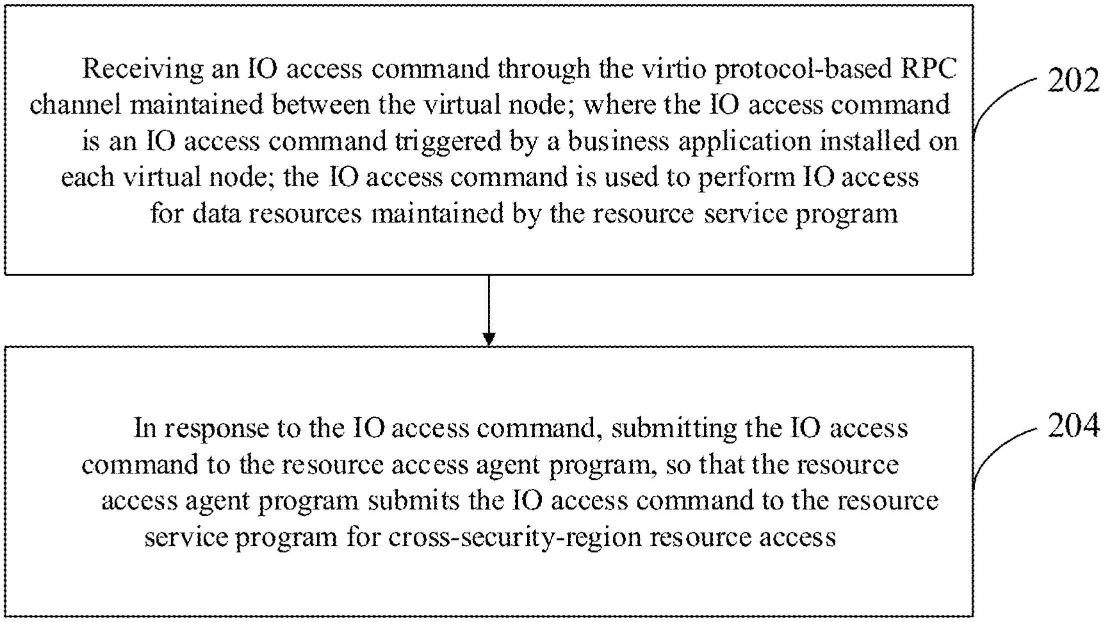
FIG. 2 is a flow diagram of a cross-security-region resource access method in a cloud computing system illustrated by an exemplary embodiment.

Please refer to FIG. 2, FIG. 2 is a flow diagram of a cross-security-region resource access method in a cloud computing system provided by an exemplary embodiment; the cloud computing system includes a computing node device in a user security region (for example, it may include multiple computing node devices) and a resource service program in a resource security region isolated from the user security region; where the computing node device respectively carries at least one virtual node and a resource access agent program corresponding to the at least one virtual node; an virtio protocol-based RPC channel is maintained between the computing node device and the carried virtual node; the method is applied to the computing node device; the above method performs the following steps:

- step 202, receiving an IO access command through the virtio protocol-based RPC channel maintained between the virtual node; where the IO access command is an IO access command triggered by a business application installed on each virtual node; the IO access command is used to perform IO access for data resources maintained by the resource service program; and
- step 204: in response to the IO access command, submitting the IO access command to the resource access agent program, so that the resource access agent program submits the IO access command to the resource service program for cross-security-region resource access.

Figure 3:
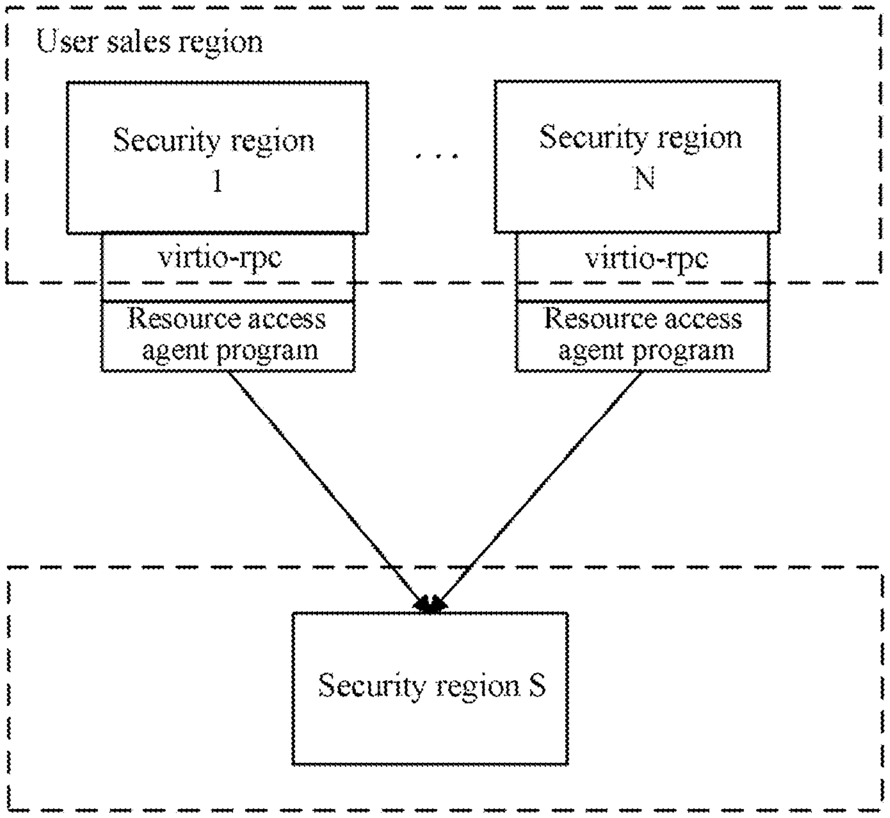
FIG. 3 is another schematic diagram of a network architecture of a cross-security-region resource access in a cloud computing system illustrated by an exemplary embodiment.

For the convenience of understanding and description, please refer to FIG. 3, which is another schematic diagram of a network architecture of a cross-security-region resource access in a cloud computing system provided by an embodiment of the present disclosure.

The user sales region, resource service region and each security region described in FIG. 3 are basically the same as those in FIG. 1. The main differences between FIG. 3 and FIG. 1 are as follows: each computing node device in each security region in the user sales region can initiate distributed resource access to the resources in the security region in resource service region based on a virtio protocol-based RPC channel (virtio-rpc as shown in FIG. 3) and its corresponding resource access agent program. The above-mentioned each computing node device carries a virtio protocol-based RPC service; at least one virtual node carried on each computing node device respectively carries a virtio protocol-based front-end driver corresponding to the virtio protocol-based RPC service, where the virtio protocol-based RPC channel includes an RPC channel maintained between the virtio protocol-based RPC service and the virtio protocol-based front-end driver.

In the preceding technical solution, each computing node device in the user security region can perform distributed access of cross-security-region resources for the resource service program in the resource security region isolated from the user security region based on the RPC mechanism extended on the virtio protocol.

However, in an actual application, virtio protocol-based RPC front-end driver is a necessary IO virtualization device in the above solution. However, common devices such as virtio protocol-based blk driver and virtio protocol-based net driver are commonly carried in existing cloud computing systems, while the virtio protocol-based RPC front-end driver is not carried therein. Therefore, the cross-security-region resource access method of the virtio protocol-based RPC channel is not applicable to most existing cloud computing systems.

Based on this, the present disclosure aims to propose a technical solution that each computing node device in the user security region uses a virtio protocol-based block (BLK) mechanism device to simulate a virtio protocol-based remote procedure call protocol (RPC) mechanism, and perform distributed access of the cross-security-region resources for the resource service program in the resource security region isolated from the user security region.

At the time of implementation, the cloud computing system can include at least one computing node device in a user security region; the computing node device can include at least one virtual node and a RPC calling server program simulated by a virtio protocol-based BLK service; the virtual node can include a virtual block device simulated by a front-end driver of the virtio protocol-based BLK service and taken as an RPC calling client; the virtual block device can include a simulated RPC channel with the RPC calling server program.

Further, the virtual block device can receive an IO access request triggered by a business application installed on the virtual node; where the IO access request can be used to perform IO access for target data resources in the resource security region; the user security region and the resource security region are isolated from each other.

Further, the virtual block device can encapsulate the IO access request into an RPC request for performing an RPC calling for the target data resources in response to the IO access request, and can send the RPC request to the RPC calling server program through the RPC channel, so that the RPC calling server program can initiate a cross-security-region RPC calling for the target data resources based on the RPC request.

It should be noted that the computing node carries at least one resource access agent program, and the number of the resource access agent programs is mainly determined by the number of the resource service program that need to be accessed, which is not specified in the present disclosure.

In addition, a specific method for determining a target resource access agent program corresponding to the type of data resources to which it is requested to access by the IO access request are not specified in the present disclosure. For example, it can be judged to determine based on the type of the data resource to which it is requested to access carried in the IO access request, or be searched to determine based on that a command type of the IO access request searches the type of the data resource of the corresponding type.

In the above technical solution, the virtual block device is simulated by the virtio protocol-based BLK front-end in the cloud computing system and taken as the RPC calling client. the virtual block device receives the IO access request for data resources maintained by the resource service program triggered by the business application on each virtual node through the simulated RPC channel of the RPC calling server program with the virtual block device; the virtual block device, in response to the IO access request, encapsulates the IO access request into the RPC request for performing the RPC calling for the target data resources, and sends the RPC request to the RPC calling server program through the RPC channel, so that the RPC calling server program initiates the cross-security-region RPC calling for the target data resources based on the RPC request, each computing node device in the user security region uses a virtio protocol-based RPC mechanism simulated by a virtio protocol-based BLK device to implement distributed access to cross-security-region resources of the resource service program in the resource security region isolated from the user security region. An IO forwarding path for resource access by the business application installed on each virtual node carried on each computing node is shortened, which greatly reduces the IO latency for resource access; a distributed access mechanism is used to access resources, avoiding a performance bottleneck of a central forwarding mechanism of network virtualization technology, and improving the overall efficiency of IO processing. Moreover, in the cloud computing system, the virtio protocol-based BLK device is used to simulate the virtio protocol-based RPC access mechanism, and the virtio protocol-based RPC access mechanism can be deployed in existing cloud computing systems, which has stronger applicability and practicability.

The present disclosure is described by specific embodiments and combined with specific application scenarios.

Figure 4:
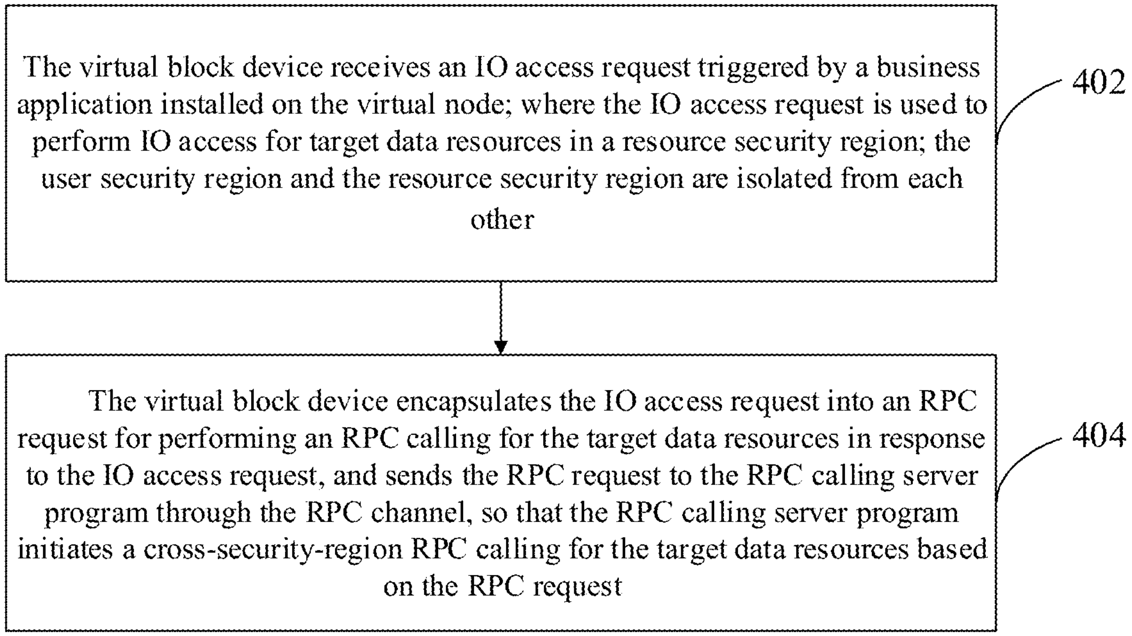
FIG. 4 is another flow diagram of a cross-security-region resource access method in a cloud computing system illustrated by an exemplary embodiment.

Please refer to FIG. 4, FIG. 4 is a flow diagram of a cross-security-region resource access method in a cloud computing system provided by an exemplary embodiment; the cloud computing system includes at least one computing node device in a user security region; the computing node device includes at least one virtual node and a RPC calling server program simulated by a virtio protocol-based BLK service; the virtual node includes a virtual block device simulated by a front-end driver of the virtio protocol-based BLK service and taken as an RPC calling client; the virtual block device includes a simulated RPC channel with the RPC calling server program; the above method performs the following steps:

step 402, the virtual block device receives an IO access request triggered by a business application installed on the virtual node; where the IO access request is used to perform IO access for target data resources in a resource security region; the user security region and the resource security region are isolated from each other; and step 404, the virtual block device encapsulates the IO access request into an RPC request for performing an RPC calling for the target data resources in response to the IO access request, and sends the RPC request to the RPC calling server program through the RPC channel, so that the RPC calling server program initiates a cross-security-region RPC calling for the target data resources based on the RPC request.

In the present disclosure, the cloud computing system can include any type of cloud computing system. For example, in a practical application, the cloud computing system can include a public cloud, a private cloud, and a hybrid cloud.

In the present disclosure, the cloud computing system may include multiple computing node devices in a user security region and a resource service program in a resource security region isolated from the user security region.

The computing node device can include any type of computing device used to build the cloud computing system. For example, in an actual application, the computing node device can specifically include a physical server and a PC.

The resource service program can include a resource service program that provides any type of resources. For example, in a practical application, the resource service program can specifically include a resource service program that provides storage resources, a resource service program that provides database resources, a resource service program that provides network resources, and a resource service program that provides media resources.

In the present disclosure, each computing node device respectively carries at least one virtual node and a resource access agent program corresponding to the at least one virtual node, simulated RPC channels are respectively maintained between the simulated RPC calling server programs on each virtual node and each computing node device.

The virtual node can include any type of virtual node carried on the computing node device.

In an implementation shown, the virtual node can include any of the following: a virtual machine, a virtual container, where the types of the virtual machine and the virtual container are not specified in the present disclosure.

For example, the virtual machine can specifically include a KVM virtual machine, a Xen virtual machine, a Vmware virtual machine, and a Hyper-v virtual machine. The virtual container can specifically include an ordinary container and a security container, where the type of the container can include a docker container, an lxc container, and so on.

The resource access agent program can include a resource access agent program corresponding to the at least one virtual node carried on the computing node device. The resource access agent program is used as an intermediary agent to receive and process the IO access request for data resources maintained by the resource service program initiated by the business application installed on the at least one virtual node.

The resource access agent program can be directly deployed on the computing node device or on a hardware device (such as an intelligent network interface card and GPU) carried on the computing node device for running.

In the present disclosure, the business application can include any type of the business application installed on the virtual node. For example, the virtual node is used as a virtual machine, in an actual application, the business application can include a network business application, a storage business application, and a media business application installed on the virtual machine.

Figure 5:
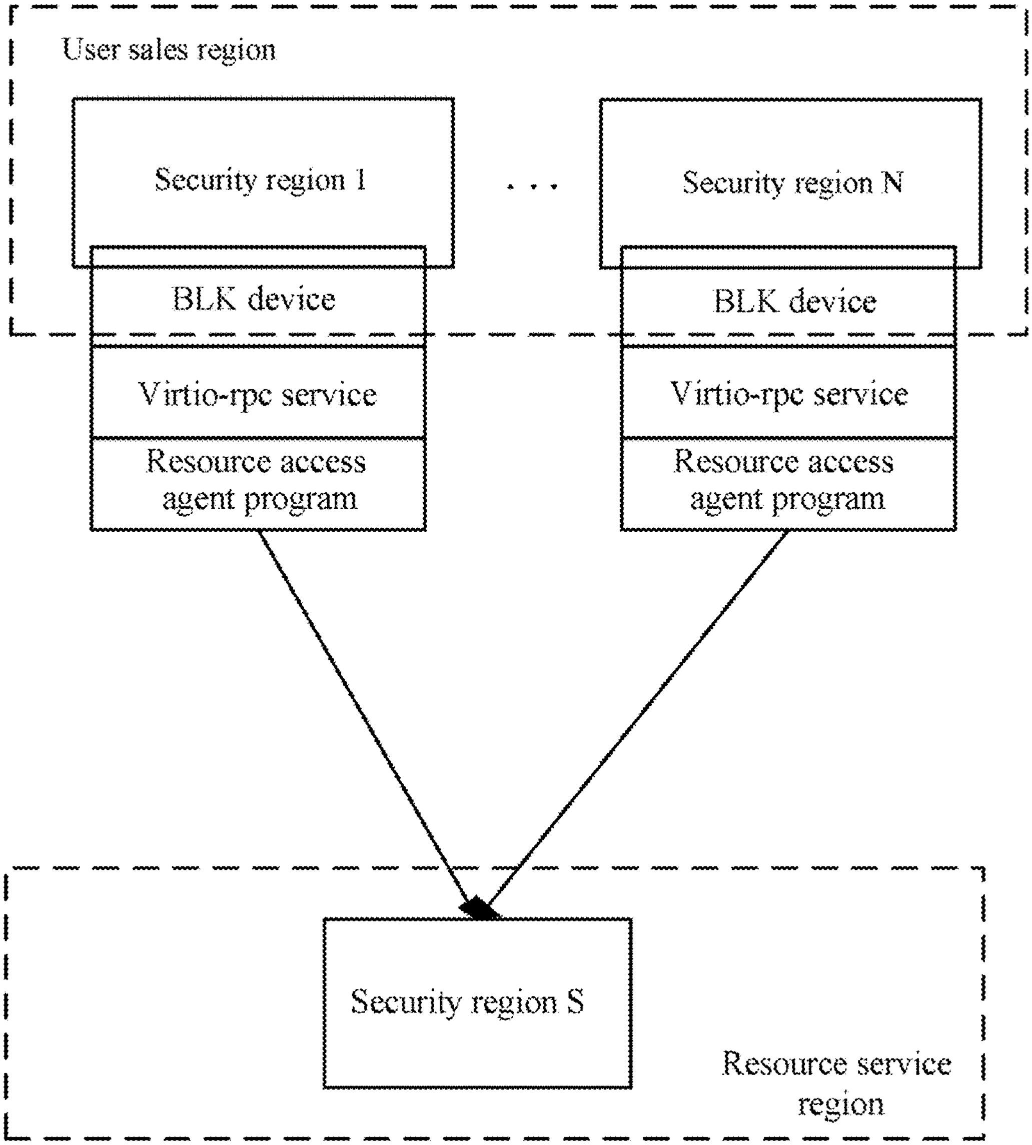
FIG. 5 is another schematic diagram of a network architecture of a cross-security-region resource access in a cloud computing system illustrated by an exemplary embodiment.

For easy understanding and description, please refer to FIG. 5, FIG. 5 is another schematic diagram of a network architecture of cross-security-region resource access in the cloud computing system provided by an embodiment of the present disclosure.

The user sales region, resource service region and each security region described in FIG. 5 are basically the same as those in FIG. 3. The main differences between FIG. 5 and FIG. 3 are as follows: RPC calling server program simulated by virtio protocol-based BLK service on the computer node; an RPC channel between the RPC calling server program simulated by the virtual block device, which is simulated by the front-end driver of virtio protocol-based BLK service and taken as th RPC calling client. Through the RPC channel, the RPC calling server program and the corresponding resource access agent program initiate distributed resource access to the resources in the security region in the resource service region.

The virtual block device has a special access mechanism. For example, there are two types of the IO request of the virtual block device, one is a write request, and the other is a read request. For the write request, user data can be written into the virtual block device, the corresponding write request does not return data, but only returns status information about whether the writing is successful or not. For the read request, a data obtaining instruction can be submitted to the virtual block device through a read interface to retrieve the data corresponding to the command.

Based on this, in an implementation shown, the IO access request includes an IO write request for the virtual block device. The business application on the virtual node triggers an IO write request. The IO write request can include a request parameter for accessing the virtual block device and a calling parameter related to RPC calling for the target data resources. After receiving the IO write request, the virtual block device can write the calling parameter in the IO request to the logical address space of the virtual block device for storage. In response to the calling parameter is successfully written into the logical address space of the virtual block device, the virtual block device can return a response message about successful writing of the IO write request to the business application that sends the IO write request, and the virtual block device will perform RPC encapsulation processing on the calling parameter stored in the logical address space to generate "RPC request" request that can be used to perform RPC calling for the target data resources. The RPC calling server program on the computing node device can call the "RPC request" request from the logical address of the virtual block device and forward the "RPC request" request to the corresponding resource access agent program to initiate the distributed resource access to the resources in the security region of the resource service region.

Correspondingly, in response to that the resource access agent program obtains RPC response data in the security region in the resource service region, the RPC response data can be forwarded to the RPC calling server program on the computing node, so that RPC calling server program on the computing node returns the RPC response data to the business application on the virtual node through the simulated RPC channel.

In another implementation shown, the IO access request may further include an IO read request for the virtual block device, where the IO read request is a request for reading data on a specified logical address space of the virtual block device. The business application on the virtual node triggers the IO read request and sends the IO read request to the virtual block device. The virtual block device, in response to the IO read request, perform encapsulation processing on the IO read request to generate an RPC read request for reading the RPC response. The RPC read request of the encapsulated RPC response can be sent to the RPC calling server program to read the RPC response on the RPC calling server program.

In another implementation shown, the IO write request triggered by the business application on the virtual node can be sent to the virtual block device, the virtual block device can encapsulate the IO write request as an "RPC request" request, and the virtual block device can return status information about whether the storage is successful or not. For example, in response to that a first RPC request is stored successfully, the virtual block device can return status information about that the storage succeeds. In addition, the virtual block device can further generate an RPC-context in memory for pairing the "RPC request" request with the "RPC response" request.

Figure 6:
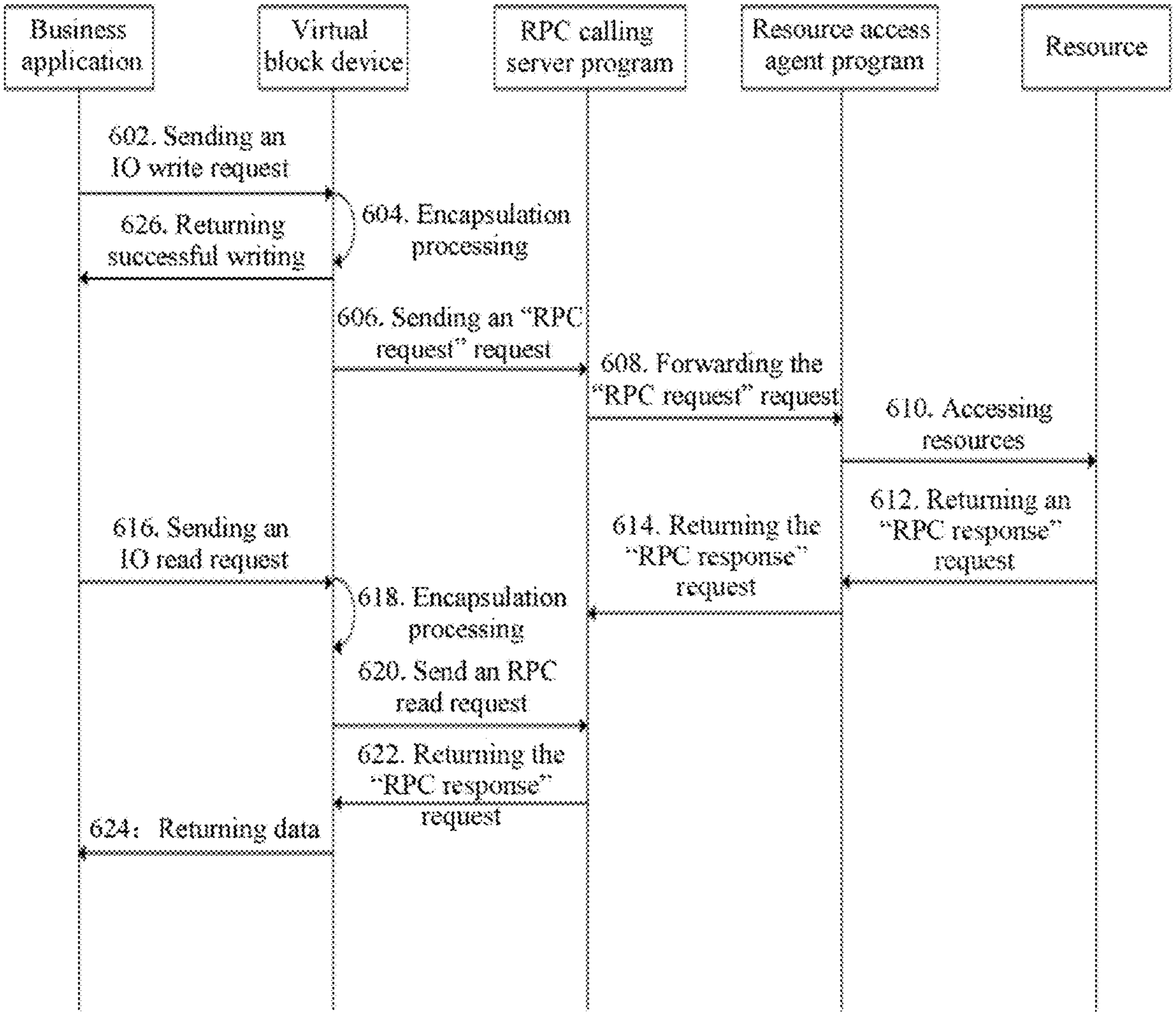
FIG. 6 is an interactive diagram of a cross-security-region resource access in a cloud computing system illustrated by an exemplary embodiment.

For easy understanding and description, please refer to FIG. 6, FIG. 6 is another multi-party interaction diagram of a cross-security-region resource access in a cloud computing system provided by an embodiment of the present disclosure.

S602, sending an IO write request triggered by a business application on a virtual node to the virtual block device.

S604, in response to the IO access request, the virtual block device stores a calling parameter related to RPC calling for target data resource in the IO write request in a logical address space specified by the virtual block device, and performs RPC encapsulation processing on the calling parameter stored in the logical address space into an "RPC request" request for performing the RPC calling for the target data resources.

S626, in response to that the parameter in the IO write request is successfully stored in the logical address space of the virtual block device, status information about the successful writing of the IO write request can be returned to the business application corresponding to the IO write request, and a RPC-context can be generated in a memory.

S606, the virtual block device sends the "RPC request" request to the RPC calling server program. Further, the RPC client service program can send a calling request to the logical address space of the virtual block device where the calling parameter is stored, and the virtual block device sends the "RPC request" request corresponding to the calling parameter in the corresponding logical address space to the RPC calling server program.

S608, in response to the "RPC request" request, the RPC calling server program forwards the "RPC request" request to the corresponding resource access agent program.

S610, in response to the "RPC request" request, accessing resources in a security region in the resource service region.

S612, returning the "RPC response" request corresponding to the "RPC request" request.

S614, in response to the "RPC response" request, the resource access agent program returns the "RPC response" request to the RPC calling server program.

S616, sending an IO read request triggered by the business application on the virtual node to the virtual block device.

S618, in response to the IO read request, the virtual block device performs encapsulation processing on the IO read request to generate an RPC read request for reading the RPC response.

S620, the virtual block device can send the RPC read request to the RPC calling server program to request to read the RPC response.

S622, the RPC calling server program, in response to the RPC read request, pairs the "RPC request" request with the RPC read request, and further pairs the "RPC response" request with the RPC read request, and returns the paired "RPC response" request to the virtual block device.

S624, in response to the "RPC response" request returned in step 622, the data corresponding to the IO read request can be returned to the corresponding business application.

In an implementation, the "RPC request" request forwarded in step 608 can be either the received "RPC request" request or the real RPC command after the RPC calling server program processes the "RPC request" request, which is not excessively restricted in the present disclosure.

Further, the IO read request triggered by the business application in the virtual node in step 616 of the above embodiment can be sent synchronously or asynchronously with the IO write request triggered by the business application in the virtual node in step 602. It should be noted that if the IO read request in step 616 is not forwarded by the virtual block device to the RPC calling server program, step 622 is not executed, and the "RPC response" request received by the RPC calling sever program can wait in the memory until the RPC read request in step 620 is sent to the RPC calling server program, and then the following steps are performed.

From the above procedure description, it can be seen that step 602 and step 616 are used to imitate the request and response in the RPC command; simulate a complete RPC command through two IO processes.

Further, the IO write request and the IO read request can simulate control of the RPC command, and then implement a transmission of some RPC control commands, such as heartbeat information.

However, using the virtual block device to simulate RPC channel for RPC data transmission, the transmission channel needs to be created in the virtual block device.

Data transmission of the virtual block device is to implement data interaction through block device by storing data to be transmitted in the logical address space of the virtual block device and reading the data stored in the logical address space of the virtual block device. The use of the virtual block device to implement the data interaction in the present disclosure is actually to use the logical address space of the virtual block device to carry out the data interaction. Therefore, it is further necessary to divide the logical address space of the virtual block device simulated by the front-end driver of virtio protocol-based BLK service for data interaction.

To implement RPC functions on the virtual block device, a blank logical address of the virtual block device can be defined and divided according to different functions. For example, the logical address space of the virtual block device can be divided into a first logical storage subspace for carrying a command queue and a second logical storage subspace for carrying a data queue.

The first logical storage subspace for carrying the command queue can include a pre-created command queue. In addition, the command queue can maintain a control command to be executed of the virtual block device. For example, it can include an encapsulation command used to encapsulate the IO write request and the IO read request; and can further include a create command for dynamically creating a data queue in a second logical storage subspace. Correspondingly, the RPC channel can include the data queue dynamically created in the second logical storage subspace by executing the control command for dynamically creating the data queue.

It should be noted that before the sending the RPC request to the RPC calling server program through the RPC channel, it is necessary to determine whether the second logical storage subspace contains the data queue dynamically created for the business application, if no, executing the creation command in the command queue to dynamically create a data channel for the business application in the second logical storage subspace for data interaction.

Further, the data queue is a continuous logical address space that may contain a number of logical storage units. To continue the above example, please refer to FIG. 6, step 606 can be allocating an idle target logical storage unit to the "RPC request" request from the data queue, and writing the "RPC request" request into the target logical storage unit, so that the RPC calling server program reads the "RPC request" request from the target logical storage unit in the data queue. Similarly, step 616 can further send the RPC read request to the RPC calling server program through the RPC channel; and can write the RPC read request into the target logical storage unit for associated storage with the "RPC request" request, so that the RPC calling server program reads an RPC read request in associated storage with the "RPC request" request from the target logical storage unit in the data queue.

Further, the writing the "RPC request" request into the target logical storage unit can be writing the "RPC request" request into an RPC context created in the target logical storage unit; in addition, it can also write the RPC read request into the RPC context created in the target logical storage unit, and perform associated storage with the "RPC request" request in the RPC context.

Further, after the RPC response corresponding to the IO read request is returned to the corresponding business application in step 624, the "RPC request" request and the RPC read request which are in associated storage with each other in the target logical storage unit can be deleted, and the target logical storage unit can be recycled and released as an idle logical storage units for usage in other data interactions.

It should be noted that in the process of simulating RPC command transmission by using the logical address of the virtual block device, the virtual block device receives and executes multiple instructions, and stores the received multiple instructions in a dynamic queue dynamically created on the data logical address space. When the instructions in the dynamic queue are executed, the concurrent control of the dynamic queue can be implemented by means of file lock, etc.

Further, the logical storage space of the virtual block device further includes a third logical storage subspace for storing configuration information of the virtual block device; where the third logical storage subspace is a read-only storage space; before step 602, the virtual block device receives a configuration information read request triggered by the business application installed on the virtual node; the virtual block device reads the configuration information of the virtual block device from the third logical storage subspace in response to the configuration information read request, and returns the read configuration information to the business application. Where the configuration information of the virtual block device can be data configuration related to the logical address space of the virtual block device, and the present disclosure is not limited.

Corresponding to the above method embodiments, the present disclosure further provides an embodiment of a cross-security-region resource access apparatus in a cloud computing system.

An embodiment of the apparatus described in the present disclosure may be applied to an electronic device. An apparatus embodiment can be implemented by software, or by hardware or a combination of hardware and software. Taking software implementation as an example, as a logical apparatus, it is formed by reading corresponding computer program instructions in a non-volatile memory into a memory by a processor of the electronic device in which it is located.

Figure 7:
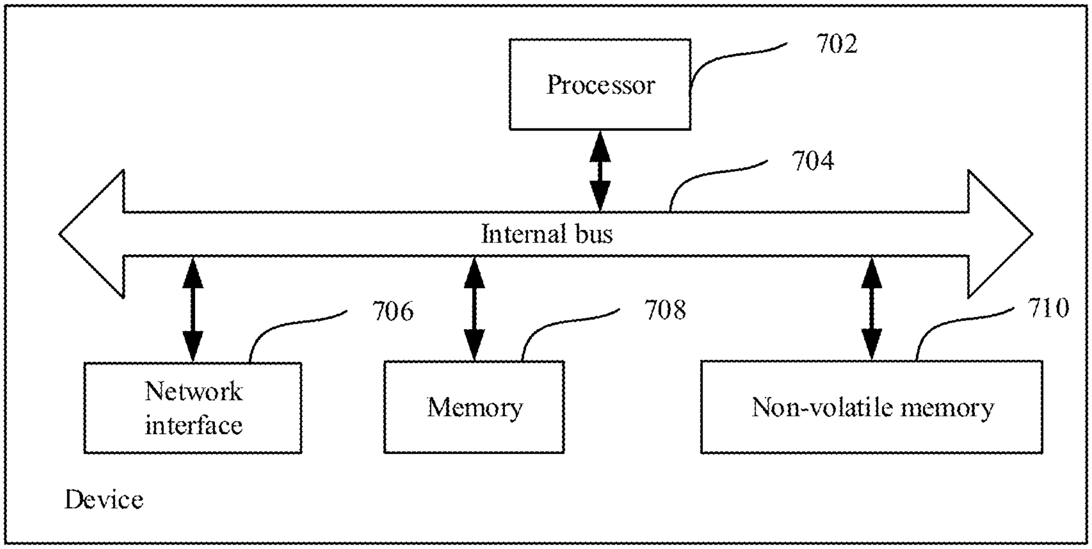
FIG. 7 is a structure diagram of an electronic device where a cross-security-region resource access apparatus is in a cloud computing system illustrated by an exemplary embodiment.

From a hardware level, as shown in FIG. 7, it is a hardware structure diagram of the electronic device where the cross-security-region resource access apparatus resides in the cloud computing system in the present disclosure. Except for the processor, memory, network interface and non-volatile memory shown in FIG. 7, the electronic device where the apparatus resides in the embodiment usually includes other hardware based on the actual function of the electronic device, which is not detailed.

Figure 8:
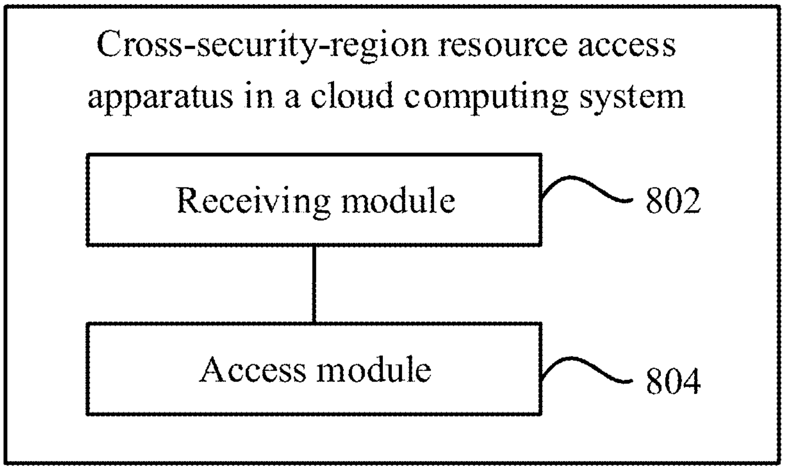
FIG. 8 is a block diagram of a cross-security-region resource access apparatus in a cloud computing system illustrated by an exemplary embodiment.

FIG. 8 is a block diagram of a cross-security-region resource access apparatus in a cloud computing system illustrated by an exemplary embodiment of the present disclosure.

Please refer to FIG. 8, the cross-security-region resource access apparatus in the cloud computing system can be applied to the electronic device shown in FIG. 8 above; the cloud computing system includes at least one computing node device in a user security region; the computing node device includes at least one virtual node and a RPC calling server program simulated by a virtio protocol-based BLK service; the virtual node includes a virtual block device simulated by a front-end driver of the virtio protocol-based BLK service and taken as an RPC calling client; the virtual block device includes a simulated RPC channel with the RPC calling server program; the device includes:

a receiving module 802, configured for the virtual block device to receive an IO access request triggered by a business application installed on the virtual node; where the IO access request is used to perform IO access for target data resources in a resource security region; the user security region and the resource security region are isolated from each other; and a access module 804, configured for the virtual block device to encapsulate the IO access request into an RPC request for performing an RPC calling for the target data resources in response to the IO access request, and send the RPC request to the RPC calling server program through the RPC channel, so that the RPC calling server program initiates a cross-security-region RPC calling for the target data resources based on the RPC request.

Further, the IO access request includes an IO write request for the virtual block device; the RPC request includes an "RPC request" request; where the IO write request includes a calling parameter related to the RPC calling performed for the target data resources;

the access module is configured for the virtual block device to write the calling parameter in the IO write request into a logical storage space of the virtual block device in response to the IO access request; and in response to successful writing of the calling parameter into the logical storage space of the virtual block device, return a successful writing response message corresponding to the IO write request to the business application installed on the virtual node; encapsulate the calling parameter stored in the logical storage space to generate the "RPC request" for performing the RPC calling for the target data resources.

The implementation of the functions and roles of each unit in the above apparatus is detailed in the implementation of the corresponding steps in the above method, and will not be repeated here.

For apparatus embodiments, since they basically correspond to method embodiments, the relevant points can be referred to part of the description of method embodiments. The apparatus embodiments described above are only schematic, where the units described as separate components may or may not be physically separate, and the components shown as units may or may not be physical units, that is, they may be in one place, or they may be distributed to multiple network units. Some or all of the modules can be selected according to the actual needs to achieve the purpose of the present disclosure. Ordinary persons skilled in the art can understand and implement without creative effort.

The system, apparatus, module or unit described in the above embodiments may be implemented specifically by a computer chip or entity, or by a product having a certain function. A typical implementation device is a computer, which may take the form of a personal computer, laptop computer, cellular phone, camera phone, smart phone, personal digital assistant, media player, navigation device, E-mail receiver, game console, tablet computer, wearable device, or any combination of these devices.

In a typical configuration, a computer includes one or more central processing units (CPU), input/output interfaces, network interfaces, and memory.

A memory may include non-permanent memory in computer readable medium, random access memory (RAM) and/or non-volatile memory in the form of read-only memory (ROM) or flash memory (flash RAM). The memory is an example of a computer readable medium.

Computer readable medium, including permanent and non-permanent, removable and non-removable medium, can be stored by any method or technology. Information can be computer-readable instructions, data structures, modules of programs, or other data. Examples of computer storage medium include, but not limited to phase change random access memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disc read-only memory (CD-ROM), digital video disk (DVD) or other optical storage, magnetic cassette tape, disk storage, quantum memory, graphene-based storage medium or other magnetic storage device or any other non-transmission medium, which can be used to store information that can be accessed by computing devices. As defined herein, computer-readable medium does not include transitory media (transitory media), such as modulated data signals and carriers.

It should also be noted that the term "include", "contain" or any other variation thereof is intended to cover non-exclusive inclusion, so that a process, method, good or device including a set of elements includes not only those elements but also other elements not expressly listed or that are inherent to the process, method, good or device. In the absence of further restrictions, an element qualified by the sentence "including a . . . " does not preclude the existence of additional identical elements in a process, method, product or equipment including the element.

Specific embodiments of the present disclosure are described above. Other embodiments are within the scope of the attached claims. In some cases, the actions or steps described in the claim may be performed in a different order than in the embodiment and still achieve a desired result. In addition, the process depicted in the accompanying drawings does not necessarily require a specific sequence or sequential sequence to achieve the desired result. In some implementations, multitasking and parallel processing are also possible or may be advantageous.

Terms used in one or more embodiments of the present disclosure are used solely for the purpose of describing specific embodiments and are not intended to limit one or more embodiments of the present disclosure. The terms "a", "said" and "the" in the singular form as used in one or more embodiments of the present disclosure and the accompanying claims are also intended to include the majority form, unless the context clearly indicates otherwise. It should also be understood that the term "and/or" as used in this text refers to and encompasses any or all possible combinations of one or more related listed items.

It should be understood that although the terms first, second and third classes may be used to describe various information in one or more embodiments of the present disclosure, such information should not be limited to these terms. These terms are used only to distinguish the same type of information from one another. For example, without departing from the scope of one or more embodiments of the present disclosure, first information may also be referred to as second information, and likewise second information may be referred to as first information. Depending on the context, the word "if" as used here can be interpreted as "at time of . . . " or "when . . . " or "in response to determination of".

The above is only a better embodiment of one or more embodiments of the present disclosure and is not intended to limit one or more embodiments of the present disclosure. Any modification, equivalent replacement, improvement, etc. made within the spirit and principles of one or more embodiments of the present disclosure shall be included within the scope of protection of one or more embodiments of the present disclosure.

The invention claimed is:

1. A cross-security-region resource access method in a cloud computing system, wherein the cloud computing system comprises at least one computing node device in a user security region; the computing node device comprises at least one virtual node and a remote procedure call protocol (RPC) calling server program simulated by a virtio protocol-based block (BLK) service; the virtual node comprises a virtual block device simulated by a front-end driver of the virtio protocol-based BLK service and taken as an RPC calling client; the virtual block device comprises a simulated RPC channel with the RPC calling server program;

the method comprises:

receiving, by the virtual block device, an input/output (IO) access request triggered by a business application installed on the virtual node; wherein the IO access request is used to perform IO access for target data resources in a resource security region; the user security region and the resource security region are isolated from each other; and encapsulating, by the virtual block device, the IO access request into an RPC request for performing an RPC calling for the target data resources in response to the IO access request, and sending the RPC request to the RPC calling server program through the RPC channel, so that the RPC calling server program initiates a cross-security-region RPC calling for the target data resources based on the RPC request.

2. The method according to claim 1, wherein the IO access request comprises an IO write request for the virtual block device; the RPC request comprises an "RPC request" request; wherein the IO write request comprises a calling parameter related to the RPC calling performed for the target data resources;

wherein the encapsulating, by the virtual block device, the IO access request into the RPC request for performing the RPC calling for the target data resources in response to the IO access request comprises:

writing, by the virtual block device, the calling parameter in the IO write request into a logical storage space of the virtual block device in response to the IO access request; and in response to successful writing of the calling parameter into the logical storage space of the virtual block device, returning a successful writing response message corresponding to the IO write request to the business application installed on the virtual node; encapsulating the calling parameter stored in the logical storage space to generate the "RPC request" for performing the RPC calling for the target data resources.

3. The method according to claim 2, wherein the IO access request further comprises an IO read request for the virtual block device; the RPC request comprises an RPC read request for reading an RPC response;

wherein the encapsulating, by the virtual block device, the IO access request into the RPC request for performing the RPC calling for the target data resources in response to the IO access request comprises:

in response to the IO read request, encapsulating the IO read request into the RPC read request for reading the RPC response.

4. The method according to claim 3, wherein the logical storage space of the virtual block device comprises a first logical storage subspace for carrying a command queue; the first logical storage subspace comprises a pre-created command queue; a control command to be executed is maintained in the command queue; the control command comprises an encapsulation command;

the encapsulating the calling parameter stored in the logical storage space to generate the "RPC request" for performing the RPC calling for the target data resources comprises:

executing the encapsulation command in the command queue to encapsulate the calling parameter stored in the logical storage space to generate the "RPC request" for performing the RPC calling for the target data resources;

the encapsulating the IO read request into the RPC read request for reading the RPC response comprises:

executing the encapsulation command in the command queue to encapsulate the IO read request into the RPC read request for reading the RPC response.

5. The method according to claim 4, wherein the logical storage space of the virtual block device further comprises a second logical storage subspace for carrying a data queue;

the control command further comprises a creation command for dynamically creating the data queue; the RPC channel comprises the data queue dynamically created in the second logical storage subspace by executing the control command;

before the sending the RPC request to the RPC calling server program through the RPC channel, the method further comprises:

executing the creation command in the command queue to dynamically create a data channel for the business application in the second logical storage subspace.

6. The method according to claim 5, wherein the data queue comprises a number of logical storage units;

the sending the "RPC request" request to the RPC calling server program through the RPC channel comprises:

allocating an idle target logical storage unit to the "RPC request" request from the data queue, and writing the "RPC request" request into the target logical storage unit, so that the RPC calling server program reads the "RPC request" request from the target logical storage unit in the data queue;

sending the RPC read request to the RPC calling server program through the RPC channel; and writing the RPC read request into the target logical storage unit for associated storage with the "RPC request" request, so that the RPC calling server program reads an RPC read request in associated storage with the "RPC request" request from the target logical storage unit in the data queue.

7. The method according to claim 6, wherein the writing the "RPC request" request into the target logical storage unit comprises:

writing the "RPC request" request into an RPC context created in the target logical storage unit;

the writing the RPC read request into the target logical storage unit for associated storage with the "RPC request" request comprises:

writing the RPC read request into the RPC context created in the target logical storage unit, and performing associated storage with the "RPC request" request in the RPC context.

8. The method according to claim 6, wherein the cloud computing system further comprises a resource service program in the resource security region; the computing node device further comprises a resource access agent program corresponding to the at least one virtual node;

the initiating, by the RPC calling server program, the cross-security-region RPC calling for the target data resources based on the RPC request comprises:

in response to the "RPC request" request read from the target logical storage unit, submitting, by the RPC calling server program, the "RPC request" request to the resource access agent program to enable the resource access agent program to further submit the "RPC request" request to the resource service program in the resource security region, so that the resource service program executes the "RPC request" request and completes the cross-security-region RPC calling for the target data resources, and returns an RPC response generated by the RPC calling to the RPC calling server program through the resource access agent program;

in response to the RPC read request read from the target logical storage unit in associated storage with the "RPC request" request, further returning, by the RPC calling server program, the RPC response returned by the resource service program to the virtual block device, so that the virtual block device returns the RPC response to the business application.

9. The method according to claim 8, further comprising:

after returning the RPC response to the business application, deleting, by the virtual block device, the "RPC request" request and the RPC read request which are in associated storage with each other in the target logical storage unit, recycling and releasing the target logical storage unit as an idle logical storage unit.

10. The method according to claim 5, wherein the logical storage space of the virtual block device further comprises a third logical storage subspace for storing configuration information of the virtual block device; wherein the third logical storage subspace is a read-only storage space; the method further comprises:

receiving, by the virtual block device, a configuration information read request triggered by the business application installed on the virtual node; reading, by the virtual block device, the configuration information of the virtual block device from the third logical storage subspace in response to the configuration information read request, and returning the read configuration information to the business application.

11. A cross-security-region resource access apparatus in a cloud computing system, wherein the cloud computing system comprises at least one computing node device in a user security region; the computing node device comprises at least one virtual node and a remote procedure call protocol (RPC) calling server program simulated by a virtio protocol-based block (BLK) service; the virtual node comprises a virtual block device simulated by a front-end driver of the virtio protocol-based BLK service and taken as an RPC calling client; the virtual block device comprises a simulated RPC channel with the RPC calling server program;

the apparatus comprises:

a processor; and a memory, configured to store processor executable instructions;

wherein the processor, when running the processor executable instructions, is configured for the virtual block device to:

receive an input/output (IO) access request triggered by a business application installed on the virtual node; wherein the IO access request is used to perform IO access for target data resources in a resource security region; the user security region and the resource security region are isolated from each other; and encapsulate the IO access request into an RPC request for performing an RPC calling for the target data resources in response to the IO access request, and send the RPC request to the RPC calling server program through the RPC channel, so that the RPC calling server program initiates a cross-security-region RPC calling for the target data resources based on the RPC request.

12. A non-transitory computer readable storage medium, wherein a computer program is stored on the non-transitory computer readable storage medium, when the computer program is executed by a processor, wherein a cloud computing system comprises at least one computing node device in a user security region; the computing node device comprises at least one virtual node and a remote procedure call protocol (RPC) calling server program simulated by a virtio protocol-based block (BLK) service; the virtual node comprises a virtual block device simulated by a front-end driver of the virtio protocol-based BLK service and taken as an RPC calling client; the virtual block device comprises a simulated RPC channel with the RPC calling server program;

wherein the processor, when running the computer program, is configured for the virtual block device to perform the following operations:

receiving an input/output (IO) access request triggered by a business application installed on the virtual node; wherein the IO access request is used to perform IO access for target data resources in a resource security region; the user security region and the resource security region are isolated from each other; and encapsulating the IO access request into an RPC request for performing an RPC calling for the target data resources in response to the IO access request, and sending the RPC request to the RPC calling server program through the RPC channel, so that the RPC calling server program initiates a cross-security-region RPC calling for the target data resources based on the RPC request.

13. The cross-security-region resource access apparatus according to claim 11, wherein the IO access request comprises an IO write request for the virtual block device; the RPC request comprises an "RPC request" request; wherein the IO write request comprises a calling parameter related to the RPC calling performed for the target data resources;

wherein the processor is configured for the virtual block device to:

write the calling parameter in the IO write request into a logical storage space of the virtual block device in response to the IO access request; and in response to successful writing of the calling parameter into the logical storage space of the virtual block device, return a successful writing response message corresponding to the IO write request to the business application installed on the virtual node; encapsulate the calling parameter stored in the logical storage space to generate the "RPC request" for performing the RPC calling for the target data resources.

14. The cross-security-region resource access apparatus according to claim 13, wherein the IO access request further comprises an IO read request for the virtual block device; the RPC request comprises an RPC read request for reading an RPC response;

wherein the processor is configured for the virtual block device to:

in response to the IO read request, encapsulate the IO read request into the RPC read request for reading the RPC response.

15. The cross-security-region resource access apparatus according to claim 14, wherein the logical storage space of the virtual block device comprises a first logical storage subspace for carrying a command queue; the first logical storage subspace comprises a pre-created command queue; a control command to be executed is maintained in the command queue; the control command comprises an encapsulation command;

wherein the processor is configured for the virtual block device to:

execute the encapsulation command in the command queue to encapsulate the calling parameter stored in the logical storage space to generate the "RPC request" for performing the RPC calling for the target data resources;

execute the encapsulation command in the command queue to encapsulate the IO read request into the RPC read request for reading the RPC response.

16. The cross-security-region resource access apparatus according to claim 15, wherein the logical storage space of the virtual block device further comprises a second logical storage subspace for carrying a data queue; the control command further comprises a creation command for dynamically creating the data queue; the RPC channel comprises the data queue dynamically created in the second logical storage subspace by executing the control command;

wherein the processor is configured for the virtual block device to:

execute the creation command in the command queue to dynamically create a data channel for the business application in the second logical storage subspace.

17. The cross-security-region resource access apparatus according to claim 16, wherein the data queue comprises a number of logical storage units;

wherein the processor is configured for the virtual block device to:

allocate an idle target logical storage unit to the "RPC request" request from the data queue, and write the "RPC request" request into the target logical storage unit, so that the RPC calling server program reads the "RPC request" request from the target logical storage unit in the data queue;

send the RPC read request to the RPC calling server program through the RPC channel; and write the RPC read request into the target logical storage unit for associated storage with the "RPC request" request, so that the RPC calling server program reads an RPC read request in associated storage with the "RPC request" request from the target logical storage unit in the data queue.

18. The cross-security-region resource access apparatus according to claim 17, wherein the processor is configured for the virtual block device to:

write the "RPC request" request into an RPC context created in the target logical storage unit;

write the RPC read request into the RPC context created in the target logical storage unit, and perform associated storage with the "RPC request" request in the RPC context.

19. The cross-security-region resource access apparatus according to claim 17, wherein the cloud computing system further comprises a resource service program in the resource security region; the computing node device further comprises a resource access agent program corresponding to the at least one virtual node;

wherein the processor is configured for the RPC calling server program to:

in response to the "RPC request" request read from the target logical storage unit, submit the "RPC request" request to the resource access agent program to enable the resource access agent program to further submit the "RPC request" request to the resource service program in the resource security region, so that the resource service program executes the "RPC request" request and completes the cross-security-region RPC calling for the target data resources, and returns an RPC response generated by the RPC calling to the RPC calling server program through the resource access agent program;

in response to the RPC read request read from the target logical storage unit in associated storage with the "RPC request" request, further return the RPC response returned by the resource service program to the virtual block device, so that the virtual block device returns the RPC response to the business application.

20. The cross-security-region resource access apparatus according to claim 19, wherein the processor is configured for the virtual block device to:

after returning the RPC response to the business application, delete the "RPC request" request and the RPC read request which are in associated storage with each other in the target logical storage unit, recycle and release the target logical storage unit as an idle logical storage unit.

* * * * *